United States Patent
Hu et al.

(10) Patent No.: US 7,589,718 B2
(45) Date of Patent: Sep. 15, 2009

(54) ELECTRIC APPARATUS HAVING AN ORGANIC ELECTRO-LUMINESCENCE DISPLAY

(75) Inventors: Shuo-Hsiu Hu, Tainan (TW); Chun-Huai Li, Pingtung County (TW)

(73) Assignee: AU Optronics Corp., Hsin-Chu (TW)

( * ) Notice: Subject to any disclaimer, the term of this patent is extended or adjusted under 35 U.S.C. 154(b) by 696 days.

(21) Appl. No.: 11/212,569

(22) Filed: Aug. 29, 2005

(65) Prior Publication Data
US 2006/0267882 A1    Nov. 30, 2006

(30) Foreign Application Priority Data
May 13, 2005    (TW) .............. 94115680 A

(51) Int. Cl.
*G09G 5/00*    (2006.01)
(52) U.S. Cl. ........................... 345/211; 345/77
(58) Field of Classification Search ............... 345/76, 345/77, 204, 211–215
See application file for complete search history.

(56) References Cited

U.S. PATENT DOCUMENTS

| | | | |
|---|---|---|---|
| 6,275,208 B1* | 8/2001 | Park ....................... | 345/94 |
| 6,369,791 B1* | 4/2002 | Kudo et al. ............... | 345/100 |
| 6,586,888 B2* | 7/2003 | Kitahara et al. ........... | 315/169.1 |
| 6,683,797 B2* | 1/2004 | Zaitsu et al. .............. | 363/16 |
| 6,812,650 B2* | 11/2004 | Yasuda et al. ............. | 315/169.1 |
| 6,876,346 B2* | 4/2005 | Anzai et al. .............. | 345/82 |
| 6,876,357 B2* | 4/2005 | Kim ....................... | 345/204 |
| 6,963,323 B2* | 11/2005 | Sakurai et al. ............ | 345/89 |
| 7,119,768 B2* | 10/2006 | Yazawa et al. ............ | 345/76 |
| 7,138,992 B2* | 11/2006 | Nakamura ................ | 345/207 |
| 7,436,376 B2* | 10/2008 | Akimoto et al. ........... | 345/76 |
| 2003/0112403 A1 | 6/2003 | Ino | |
| 2005/0052170 A1* | 3/2005 | Kim et al. ................ | 323/282 |
| 2006/0044227 A1* | 3/2006 | Hadcock ................. | 345/76 |

FOREIGN PATENT DOCUMENTS

| | | |
|---|---|---|
| CN | 1336629 A | 2/2002 |
| CN | 1386255 A | 12/2002 |
| CN | 1462025 A | 12/2003 |
| CN | 1547184 A | 11/2004 |
| TW | 561298 | 11/2003 |

* cited by examiner

*Primary Examiner*—Richard Hjerpe
*Assistant Examiner*—Tom V Sheng
(74) *Attorney, Agent, or Firm*—Bacon & Thomas, PLLC

(57) ABSTRACT

An electric apparatus having an OELD includes a DC-to-DC converter, an OELD and at least one executing unit. The DC-to-DC converter converts a first direct voltage into a second direct voltage. The OELD receives the first direct voltage. The executing unit receives the second direct voltage and thus executes a system function of the electric apparatus.

26 Claims, 8 Drawing Sheets

ELECTRIC APPARATUS HAVING AN ORGANIC ELECTRO-LUMINESCENCE DISPLAY

This application claims the benefit of Taiwan application Ser. No. 94115680, filed May 13, 2005, the subject matter of which is incorporated herein by reference.

BACKGROUND OF THE INVENTION

1. Field of the Invention

The invention relates in general to an electric apparatus having a display, and more particularly to an electric apparatus having an OELD (Organic Electro-Luminescence Display).

2. Description of the Related Art

The greatest feature of the OELD (Organic Electro-Luminescence Display) is that the OELD is self-emissive and does not need any backlight and color filter, and thus can be made thinner than the LCD (Liquid Crystal Display). In addition, the OELD has a wider viewing angle, a higher response speed, a lower driving voltage, a better color and a higher contrast, a lower power consumption and easier manufacturing processes than the LCD does, so the OELD has become a technological star of display following the LCD.

FIG. 1A is a block diagram showing a conventional electric apparatus having an OELD. Referring to FIG. 1A, the electric apparatus 10 includes a DC-to-DC converter 120, a display DC-to-DC converter 130, an OELD 170 and at least one executing unit. In FIG. 1A, a first executing unit 140, a second executing unit 150 and a third executing unit 160 are illustrated as an example. An external power 110 supplies a first direct voltage to the electric apparatus 10. The DC-to-DC converter 120 converts the first direct voltage into a second direct voltage, which serves as a working power for the first executing unit 140, the second executing unit 150 and the third executing, unit 160. The first executing unit 140, the second executing unit 150 and the third executing unit 160 receive the second direct voltage outputted from the DC-to-DC converter 120 and execute a system function of the electric apparatus 10. The display DC-to-DC converter 130 converts the first direct voltage into a third direct voltage. The OELD 170 receives the third direct voltage and executes the display function.

FIG. 1B is a block diagram showing another conventional electric apparatus having an OELD. As shown in FIG. 1B, the electric apparatus 20 differs from the electric apparatus 10 in that the display DC-to-DC converter 130 does not directly receive the first direct voltage outputted from the external power 110. Instead, the DC-to-DC converter 120 converts the first direct voltage into a second direct voltage, and the display DC-to-DC converter 130 converts the second direct voltage into a third direct voltage, which is then outputted to the OELD 170 such that the OELD 170 executes the display function.

However, the display DC-to-DC converter 130 greatly increases the cost and occupies a larger space such that the available space in the electric apparatus is relatively reduced, the layout difficulty of the printed circuit board is increased, and the EMI (Electro Magnetic Interference) tends to occur. In addition, the power conversion further attenuates the power energy efficiency, and the power consumption is thus increased.

SUMMARY OF THE INVENTION

It is therefore an object of the invention to provide an electric apparatus having an OELD (Organic Electro-Luminescence Display), wherein the number of DC-to-DC converters can be decreased due to the improvements in the manufacturing processes and the design or the change in the driving voltage.

The invention achieves the above-identified object by providing an electric apparatus including a DC-to-DC converter, an OELD and a display unit. The DC-to-DC converter converts a first direct voltage into a second direct voltage. An executing unit receives the second direct voltage and executes a system function of the electric apparatus. The OELD receives the first direct voltage.

The invention also achieves the above-identified object by providing an electric apparatus including a DC-to-DC converter, an OELD and a display unit. The DC-to-DC converter converts a first direct voltage into a second direct voltage. The OELD receives the second direct voltage. An executing unit receives the second direct voltage and executes a system function of the electric apparatus.

The invention also achieves the above-identified object by providing an electric apparatus including a DC-to-DC converter, an OELD and an executing unit. The DC-to-DC converter converts a first direct voltage into a second direct voltage. The executing unit receives the second direct voltage and executes a system function of the electric apparatus. A passive device voltage converting unit converts the first direct voltage into a third direct voltage. The OELD receives the third direct voltage.

The invention also achieves the above-identified object by providing an electric apparatus including a DC-to-DC converter, an OELD and an executing unit. The DC-to-DC converter converts a first direct voltage into a second direct voltage. The executing unit receives the second direct voltage and executes a system function of the electric apparatus. A passive device voltage converting unit converts the second direct voltage into a third direct voltage. The OELD receives the third direct voltage.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 2:
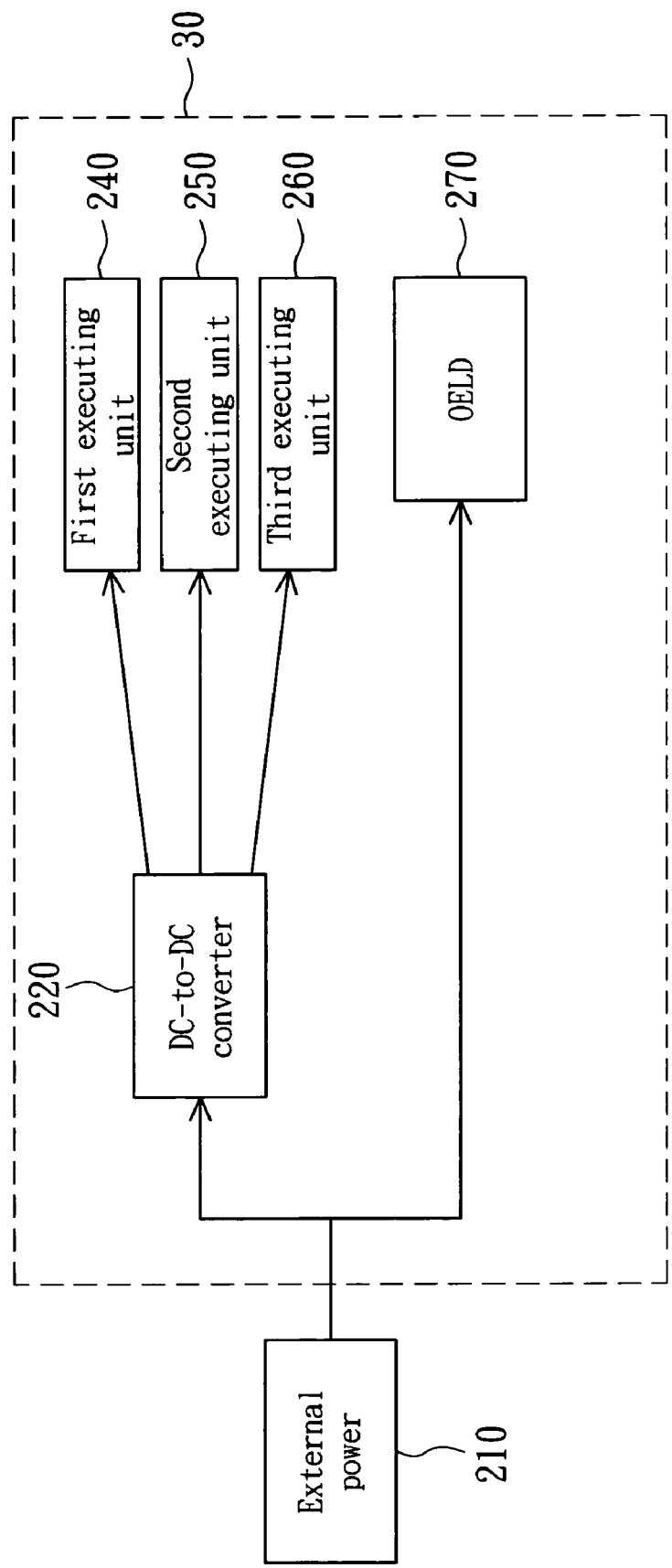
FIG. 2 is a block diagram showing an electric apparatus having an OELD according to a first embodiment of the invention.

FIG. 2 is a block diagram showing an electric apparatus having an OELD according to a first embodiment of the invention. Referring to FIG. 2, an electric apparatus 30, such as a digital camera or a mobile phone, includes a DC-to-DC converter 220, at least one executing unit (three executing units including a first executing unit 240, a second executing unit 250 and a third executing unit 260 are described as an example), and an OELD 270. An external power 210, which may be, for example, a lithium battery in the digital camera or the mobile phone, supplies a first direct voltage to the electric apparatus 30. The OELD 270, which may be, for example, a PLED (Polymer Light-Emitting Diode) display or an OLED (Organic Light-Emitting Diode) display, receives the first direct voltage and executes a display function. The DC-to-DC converter 220 converts the first direct voltage into a second direct voltage. The first executing unit 240, the second executing unit 250 and the third executing unit 260 receive the second direct voltage and execute the system function of the electric apparatus 30. The executing unit in the digital camera may be, for example, a flash driving circuit, an image capturing circuit or a lens switch driving circuit for flashing the flash, capturing the image, or controlling the lens switch according to the function and object thereof.

Second Embodiment

Figure 3:
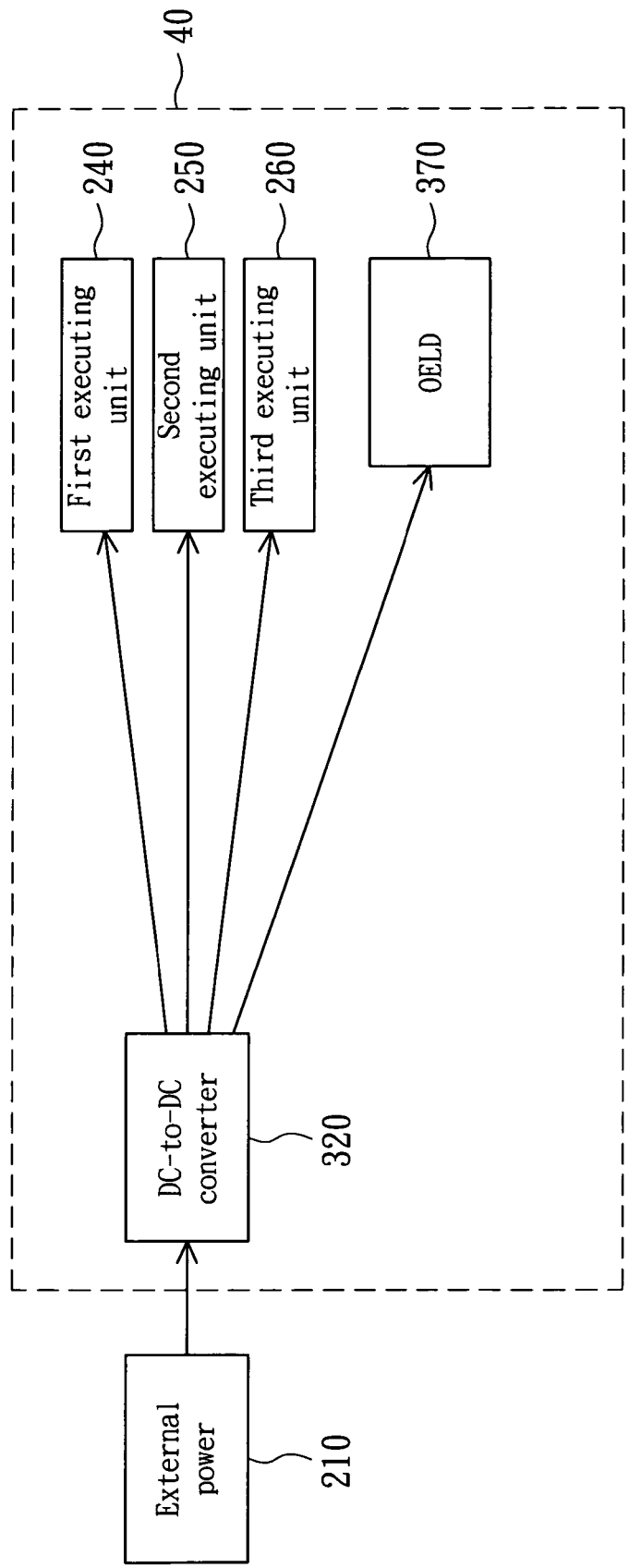
FIG. 3 is a block diagram showing an electric apparatus having an OELD according to a second embodiment of the invention.

FIG. 3 is a block diagram showing an electric apparatus having an OELD according to a second embodiment of the invention. As shown in FIG. 3, an electric apparatus 40 differs from the electric apparatus 30 in that an OELD 370 does not directly receive the first direct voltage outputted from the external power 210. Instead, a DC-to-DC converter 320 converts the first direct voltage into a second direct voltage, and then the OELD 370 receives the second direct voltage outputted from the DC-to-DC converter 320 and executes the display function thereof.

Third Embodiment

Figure 4:
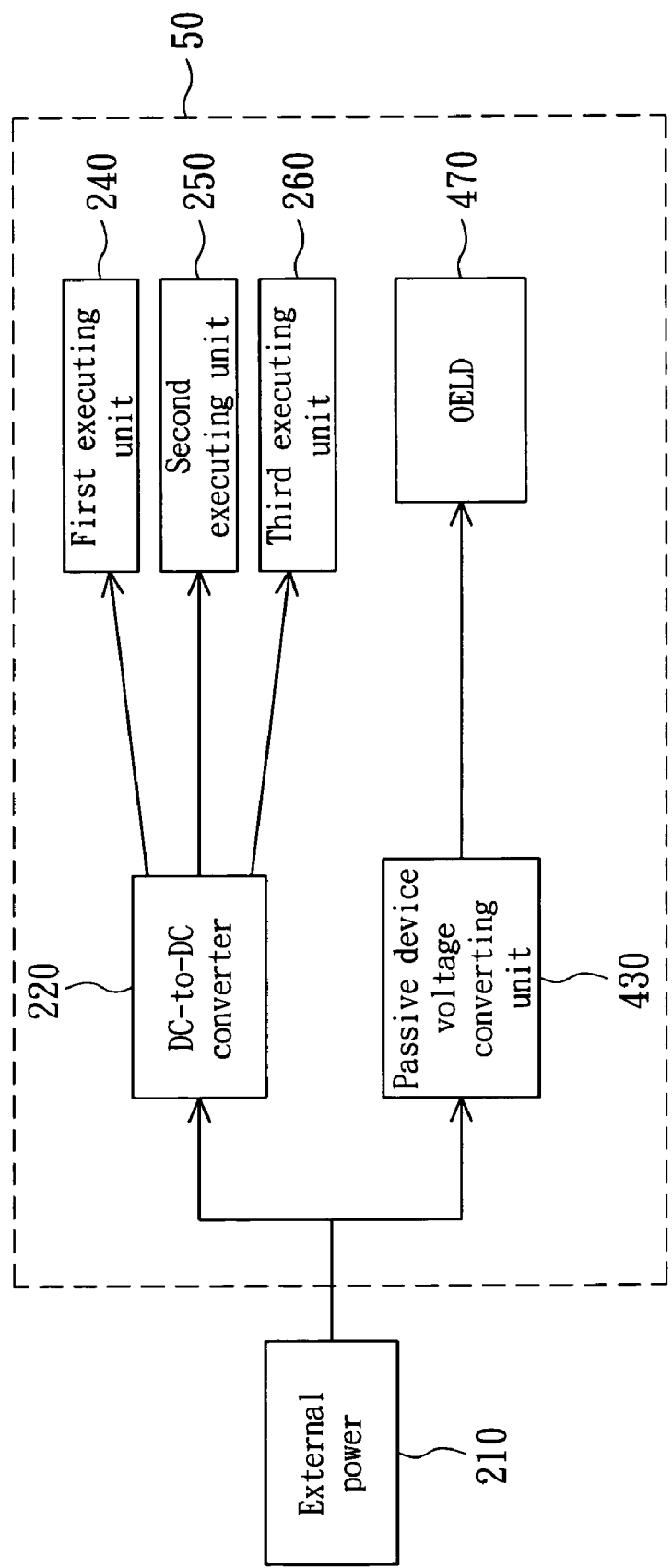
FIG. 4 is a block diagram showing an electric apparatus having an OELD according to a third embodiment of the invention.

FIG. 4 is a block diagram showing an electric apparatus having an OELD according to a third embodiment of the invention. As shown in FIG. 4, an electric apparatus 50 differs from the electric apparatus 30 in that the electric apparatus 50 further includes a passive device voltage converting unit 430 between the external power 210 and an OELD 470. The passive device voltage converting unit 430 converts the first direct voltage into a third direct voltage, and then the OELD 470 receives the third direct voltage outputted from the passive device voltage converting unit 430 and executes the display function.

The passive device voltage converting unit 430 differs from the DC-to-DC converter in that the passive device voltage converting unit 430 is composed of passive devices, such as diodes. The first direct voltage is decreased and then the third direct voltage is outputted according to the voltage-drop property of the diodes themselves. Compared to the display DC-to-DC converter 130, the passive devices have a smaller size, lower power consumption, and a much lower cost than the display DC-to-DC converter 130.

Fourth Embodiment

Figure 5:
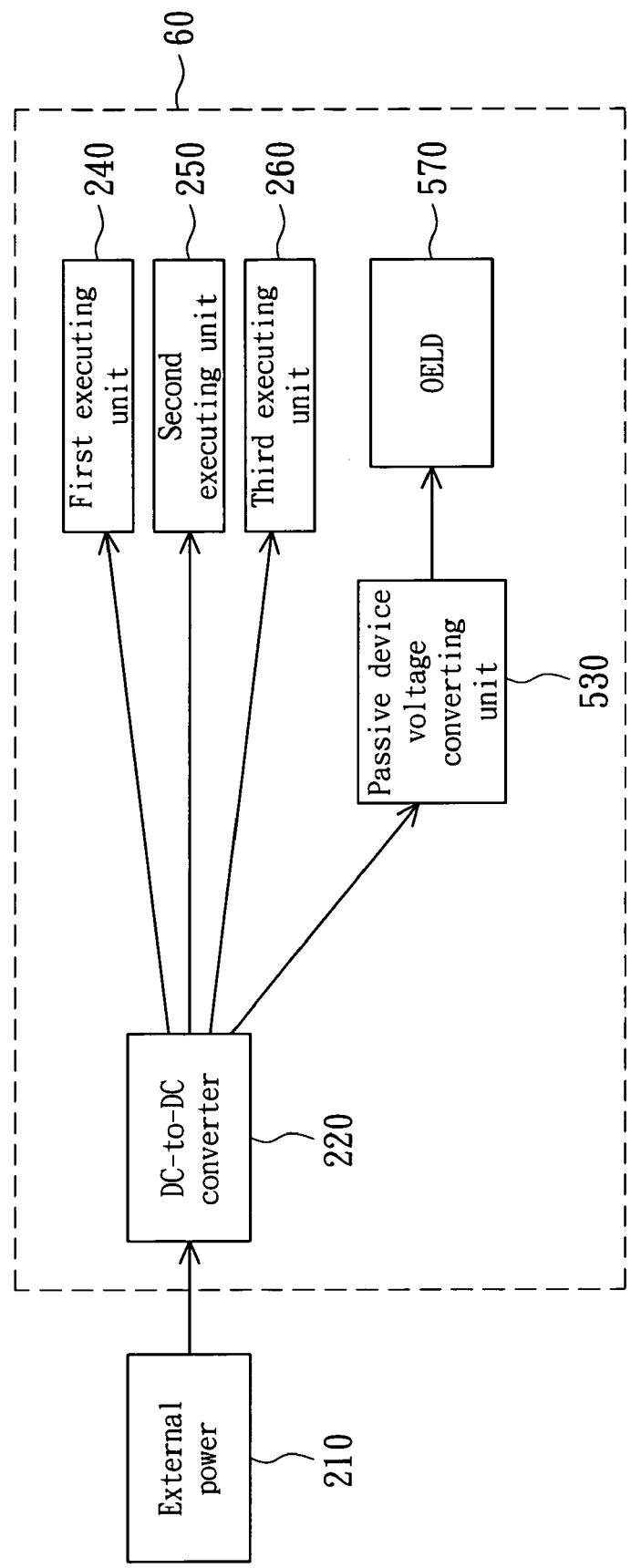
FIG. 5 is a block diagram showing an electric apparatus having an OELD according to a fourth embodiment of the invention.

FIG. 5 is a block diagram showing an electric apparatus having an OELD according to a fourth embodiment of the invention. As shown in FIG. 5, an electric apparatus 60 differs from the electric apparatus 40 in that the electric apparatus 60 further includes a passive device voltage converting unit 530 between the DC-to-DC converter 220 and an OELD 570. The passive device voltage converting unit 530 converts the second direct voltage outputted from the DC-to-DC converter 220 into a third direct voltage, and then the OELD 570 receives the third direct voltage outputted from the passive device voltage converting unit 530 and executes the display function.

The working powers for the OELDs in the electric apparatuses of the four embodiments can be supplied by the DC-to-DC converter 220 or the external power 210, and the display DC-to-DC converter 130 is not needed. The method of omitting the display DC-to-DC converter 130 in the electric apparatuses 30, 40, 50 and 60 will be described in detailed in the following.

Figure 6A:
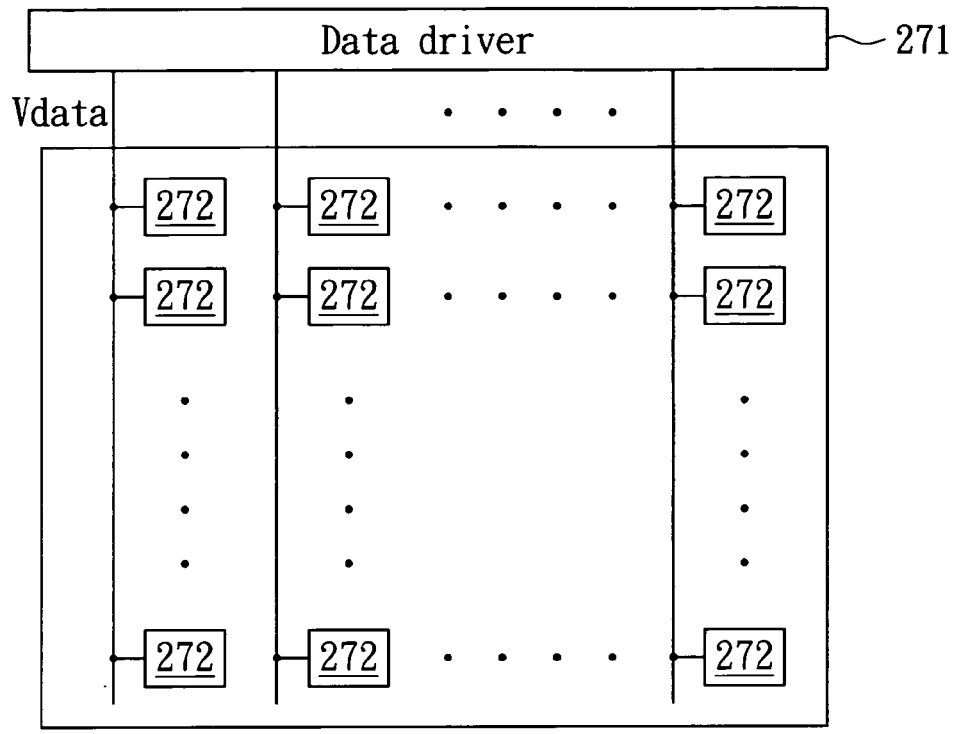
FIG. 6A is a schematic illustration showing an OELD applied to the preferred embodiment of the invention.
Figure 6B:
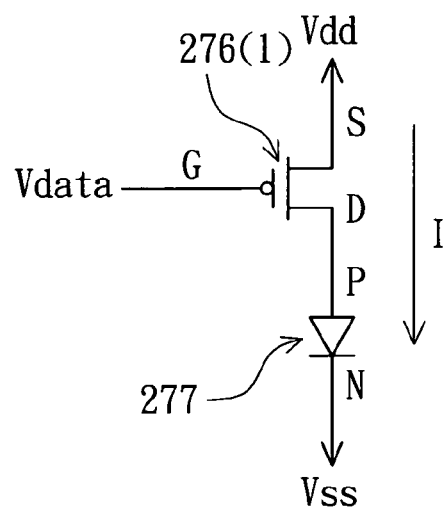
FIG. 6B is a schematic illustration showing a first pixel in the OELD according to the preferred embodiment of the invention.
Figure 6C:
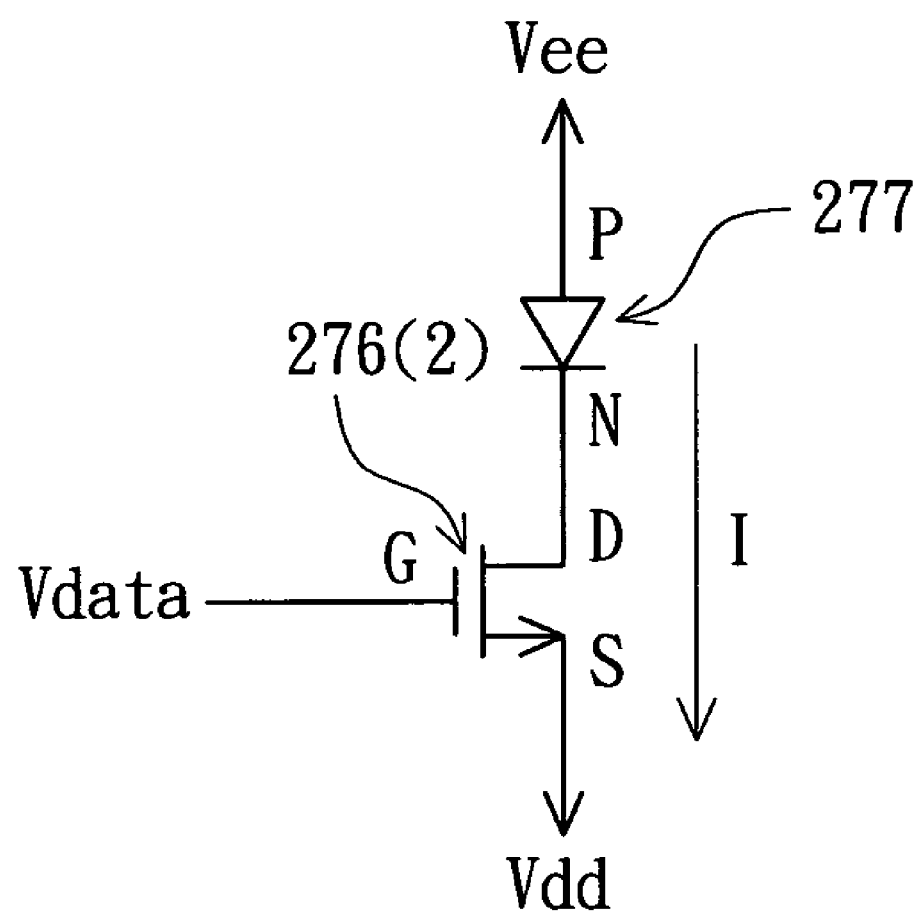
FIG. 6C is a schematic illustration showing a second pixel in the OELD according to the preferred embodiment of the invention.

FIG. 6A is a schematic illustration showing an OELD applied to the preferred embodiment of the invention. FIG. 6B is a schematic illustration showing a first pixel in the OELD according to the preferred embodiment of the invention. FIG. 6C is a schematic illustration showing a second pixel in the OELD according to the preferred embodiment of the invention. Referring to FIGS. 6A to 6C, the OELD 270 includes a data driver 271 and several pixels 272. The data driver 271 outputs a pixel voltage Vdata. Each pixel 272 includes an organic electro-luminescence diode 277 and a transistor 276, which may be a P-type transistor 276(1) or an N-type transistor 276(2).

When the P-type transistor 276(1) serves as the transistor 276 in the pixel 272, the negative terminal N of the organic electro-luminescence diode 277 is coupled to a low voltage Vss, which may be a negative voltage. The source S of the P-type transistor 276(1) receives a direct voltage Vdd, which is the first direct voltage in the electric apparatus 30, the second direct voltage in the electric apparatus 40, and the third direct voltage in the electric apparatuses 50 and 60, the gate G of the P-type transistor 276(1) receives the pixel voltage Vdata, and the drain D of the P-type transistor 276(1) is electrically connected to the positive terminal P of the organic electro-luminescence diode 277.

As shown in FIG. 6C, when the N-type transistor 276(2) serves as the transistor 276 in the pixel 272, the positive terminal P of the organic electro-luminescence diode 277 is coupled to a direct voltage Vee, the drain D of the N-type transistor 276(2) is electrically connected to the negative terminal N of the organic electro-luminescence diode 277, the gate of the N-type transistor 276(2) receives the pixel voltage Vdata, and the source S of the N-type transistor 276(2) is coupled to the direct voltage Vdd. Either the P-type transistor 276(1) or the N-type transistor 276(2) serves as the transistor 276, the driving current flowing through the organic electro-luminescence diode 277 is substantially equal to the driving current flowing through the transistor 276.

Figure 1A:
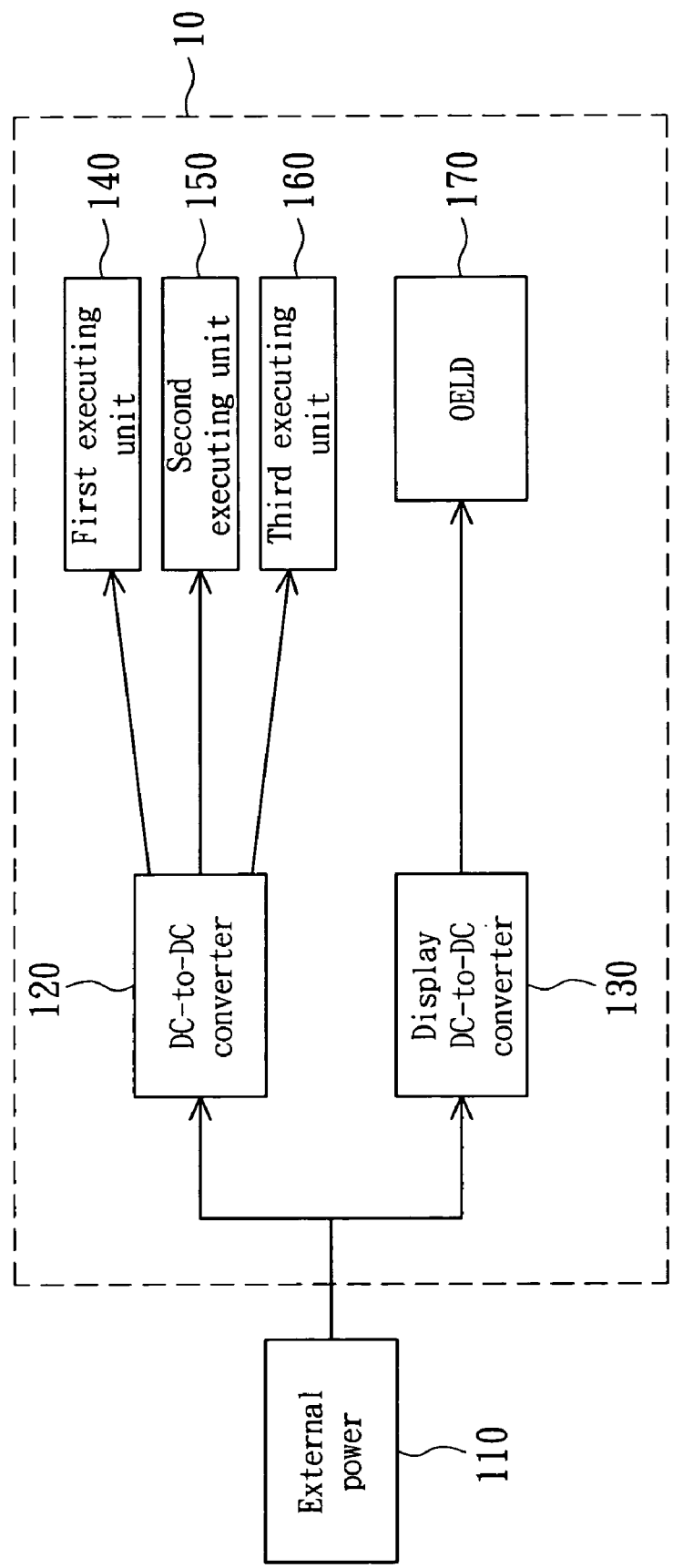
FIG. 1A is a block diagram showing a conventional electric apparatus having an OELD.
Figure 1B:
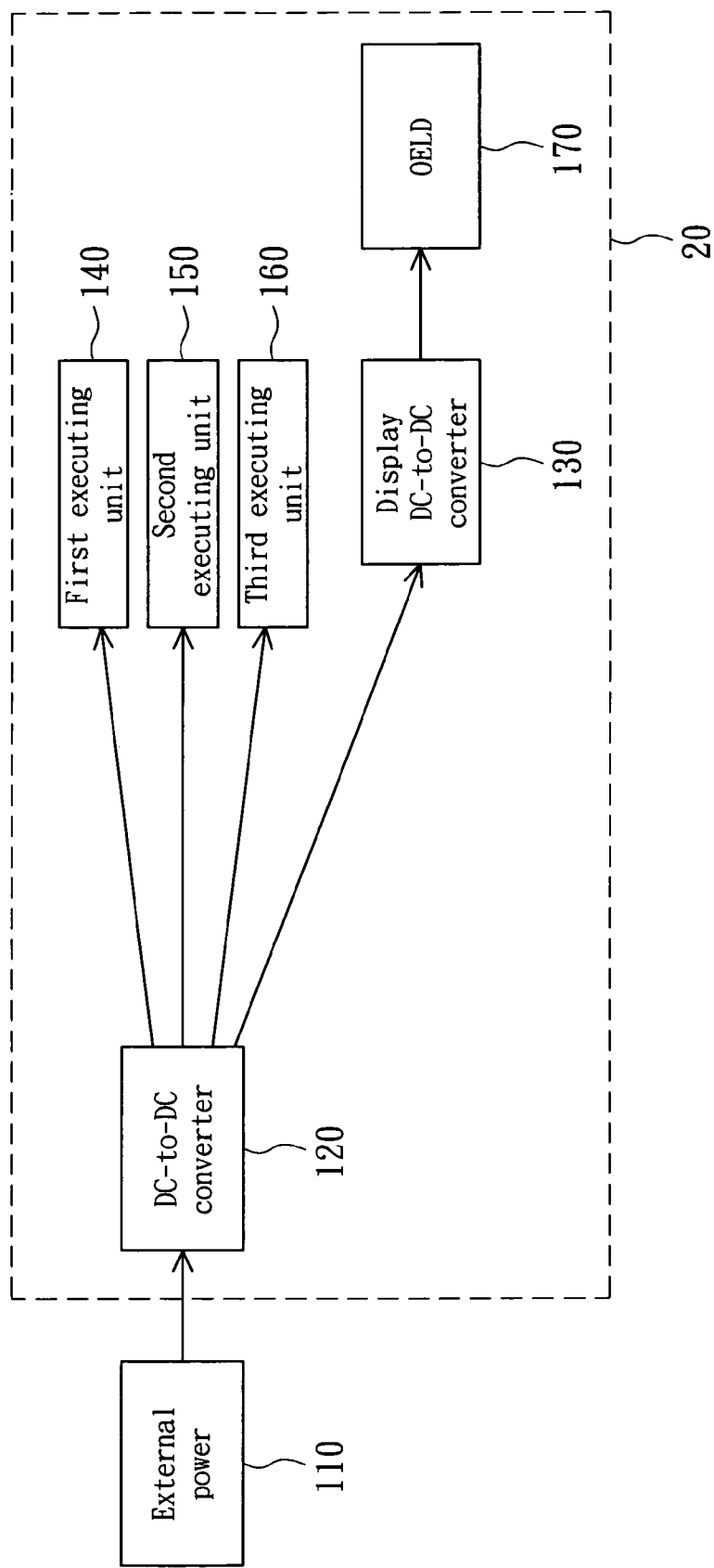
FIG. 1B is a block diagram showing another conventional electric apparatus having an OELD.

The driving current I flowing through the organic electro-luminescence diode 277 determines the luminance of the OELD 270. Thus, when the driving current I reaches a rated current corresponding to a rated pixel voltage, the organic electro-luminescence diode 277 generates a rated luminance. When the first direct voltage supplied by the external power 210 changes, the transistor 276 generates a current substantially the same as the rated current as the gate G of the transistor 276 receives the rated pixel voltage in this embodiment by changing the width-to-length ratio of a channel of the transistor 276. Consequently, when the organic electro-luminescence diode 277 is applied to the OELD 270/370/470/570 of FIGS. 2 to 5, the OELD 270/370/470/570 can generate the desired rated luminance by only changing the width-to-length ratio of the channel of the organic electro-luminescence diode 277 of FIG. 6B according to the value of the received first direct voltage or third direct voltage. Thus, the OELD 270/370/470/570 can display the required luminance without the display DC-to-DC converter 130 of FIG. 1A or 1B being used.

In addition, it is also possible to change the method of driving the organic electro-luminescence diode 277 to achieve the object of omitting the display DC-to-DC converter of the invention. Because the value of the driving current I depends on the gate-source voltage of the transistor 276, the voltage vale of the gate G (i.e., the value of the pixel voltage Vdata) may be correspondingly changed to obtain the same driving current I when the Vdd received at the source S changes, such that the organic electro-luminescence diode 277 generates the same luminance. It is assumed that the driving current I generated by the transistor 276 as the gate-source voltage of the transistor 276 reaches a first potential difference is such that the luminance of the organic electro-luminescence diode 277 reaches a maximum, and the driving current I generated by the transistor 276 as the gate-source voltage reaches a second potential difference is such that the luminance of the organic electro-luminescence diode 277 reaches a minimum. Thus, the data driver 271 controls the pixel voltage Vdata to make a variation of the pixel voltage Vdata substantially the same as the variation of the direct voltage Vdd in this embodiment, when the direct voltage Vdd at the source S of the transistor 276 changes, according to the variation of the direct voltage Vdd. Meanwhile, a substantially constant first potential difference and a substantially constant second potential difference are held. Hence, when the organic electro-luminescence diode 277 is applied to the OELD 270/370/470/570 of FIGS. 2 to 5, the OELD 270/370/470/570 may generate the desired luminance by changing the pixel voltage Vdata received by the organic electro-luminescence diode 277 of FIG. 6B according to the value of the received first direct voltage or third direct voltage. Thus, the display DC-to-DC converter may be omitted.

The electric apparatuses having OELDs according to the embodiments of the invention can have the same luminance even if different external powers are used.

A second advantage of this invention is to reduce the power consumption. The electric apparatus of this embodiment does not need to use a display DC-to-DC converter, so the energy loss caused by the DC voltage conversion in the display DC-to-DC converter may be reduced. In particular, when the electric apparatus is the digital camera or mobile phone with the external power of one lithium battery, the reduction in the power consumption can relatively lengthen the working time of the lithium battery in the electric apparatus.

A third advantage of this invention is to save the space. The display DC-to-DC converter occupies about 40% space in the conventional electric apparatus. Thus, the available space in the electric apparatus is relatively reduced, which tends to cause the EMI because the other disposed electronic elements are too close to one another. In order to avoid the EMI, a shielding device, such as a metal cover, has to be added. Because the above-mentioned embodiments do not need any display DC-to-DC converter, the available space in the electric apparatus may be enlarged, and the EMI problem may be further solved.

A fourth advantage of this invention is to reduce the manufacturing cost. The cost of one display DC-to-DC converter is not low. The manufacturing cost may be reduced and the product competitiveness may be enhanced because no display DC-to-DC converter has to be used in these embodiments.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electric apparatus, comprising:
    a DC-to-DC converter for converting a first direct voltage into a second direct voltage;
    at least one executing unit for receiving the second direct voltage and executing a system function of the electric apparatus; and
    an OELD (Organic Electro-Luminescence Display), for receiving the first direct voltage or the second direct voltage, comprising a data driver for outputting a pixel voltage and a plurality of pixels, wherein each of the pixels comprises:
    an organic electro-luminescence diode; and
    a transistor having a source for receiving the first direct voltage or the second direct voltage, a gate for receiving the pixel voltage, and a drain electrically connected to the organic electro-luminescence diode, wherein:
    at least one first potential difference and at least one second potential difference exist between the source and the gate of the transistor;
    the at least one first potential difference is generated when the organic electro-luminescence diode has a maximum luminance, and the at least one second potential difference is generated when the organic electro-luminescence diode has a minimum luminance; and
    when the first direct voltage or the second direct voltage changes, the data driver controls the pixel voltage according to a variation of the first direct voltage or a variation of the second direct voltage, such that the pixel voltage has a variation substantially the same as the variation of the first direct voltage or the variation of the second direct voltage, and the at least one first potential difference and the at least one second potential difference are substantially held constant.

2. The electric apparatus according to claim 1, wherein the first direct voltage is supplied by an external power.

3. The electric apparatus according to claim 1, wherein the OELD is a PLED (Polymer Light-Emitting Diode) display.

4. The electric apparatus according to claim 1, wherein the OELD is an OLED (Organic Light-Emitting Diode) display.

5. The electric apparatus according to claim 1, wherein the organic electro-luminescence diode has a negative terminal coupled to a low voltage, and the transistor is a P-type transistor and has the drain electrically connected to a positive terminal of the organic electro-luminescence diode.

6. The electric apparatus according to claim 1, wherein the organic electro-luminescence diode has a positive terminal coupled to a high voltage, and the transistor is an N-type transistor and has the drain electrically connected to a negative terminal of the organic electro-luminescence diode.

7. An electric apparatus, comprising:
    a DC-to-DC converter for converting a first direct voltage into a second direct voltage;

at least one executing unit for receiving the second direct voltage and executing a system function of the electric apparatus;

a passive device voltage converting unit for converting the first direct voltage or the second direct voltage into a third direct voltage; and an OELD (Organic Electro-Luminescence Display) for receiving the third direct voltage, comprising a data driver for outputting a pixel voltage and a plurality of pixels, wherein each of the pixels comprises:

an organic electro-luminescence diode; and a transistor having a source for receiving the third direct voltage, a gate for receiving the pixel voltage, and a drain electrically connected to the organic electro-uminescence diode, wherein:

at least one first potential difference and at least one second potential difference exist between the source and the gate of the transistor;

the at least one first potential difference is generated when the organic electro-luminescence diode has a maximum luminance, and the at least one second potential difference is generated when the organic electro-luminescence diode has a minimum luminance; and when the third direct voltage changes, the data driver controls the pixel voltage according to a variation of the third direct voltage, such that the pixel voltage has a variation substantially the same as the variation of the third direct voltage, and the at least one first potential difference and the at least one second potential difference are substantially held constant.

8. The electric apparatus according to claim 7, wherein the first direct voltage is supplied by an external power.

9. The electric apparatus according to claim 7, wherein the OELD is a PLED (Polymer Light-Emitting Diode) display.

10. The electric apparatus according to claim 7, wherein the OELD is an OLED (Organic Light-Emitting Diode) display.

11. The electric apparatus according to claim 7, wherein the organic electro-luminescence diode has a negative terminal coupled to a low voltage, and the transistor is a P-type transistor and has the drain electrically connected to a positive terminal of the organic electro-luminescence diode.

12. The electric apparatus according to claim 7, wherein the passive device voltage converting unit is a passive device.

13. The electric apparatus according to claim 7, wherein the organic electro-luminescence diode has a positive terminal coupled to a high voltage, and the transistor is an N-type transistor and has the drain electrically connected to a negative terminal of the organic electro-luminescence diode.

14. An electric apparatus, comprising:
a DC-to-DC converter for converting a first direct voltage into a second direct voltage;
at least one executing unit for receiving the second direct voltage and executing a system function of the electric apparatus; and
an OELD (Organic Electro-Luminescence Display), for receiving the first direct voltage or the second direct voltage, comprising a plurality of pixels, wherein each of the pixels comprises:
an organic electro-luminescence diode generating a rated luminance when a rated current flows through the organic electro-luminescence diode; and
a transistor having a source for receiving the first direct voltage or the second direct voltage, a gate for receiving a pixel voltage, and a drain electrically connected to the organic electro-luminescence diode, wherein:
the rated current corresponds to a rated pixel voltage;
a current flowing through the organic electro-luminescence diode is substantially equal to a current flowing through the transistor; and
when the first direct voltage or the second direct voltage changes, the transistor generates a current substantially the same as the rated current as the gate of the transistor receives the rated pixel voltage by changing a width-to-length ratio of a channel of the transistor.

15. The electric apparatus according to claim 14, wherein the first direct voltage is supplied by an external power.

16. The electric apparatus according to claim 14, wherein the OELD is a PLED (Polymer Light-Emitting Diode) display.

17. The electric apparatus according to claim 14, wherein the OELD is an OLED (Organic Light-Emitting Diode) display.

18. The electric apparatus according to claim 14, wherein the organic electro-luminescence diode has a negative terminal coupled to a low voltage, and the transistor is a P-type transistor and has the drain electrically connected to a positive terminal of the organic electro-luminescence diode.

19. The electric apparatus according to claim 14, wherein the organic electro-luminescence diode has a positive terminal coupled to a high voltage, and the transistor is a N-type transistor and has the drain electrically connected to a negative terminal of the organic electro-luminescence diode.

20. An electric apparatus, comprising:
a DC-to-DC converter for converting a first direct voltage into a second direct voltage;
at least one executing unit for receiving the second direct voltage and executing a system function of the electric apparatus;
a passive device voltage converting unit for converting the first direct voltage or the second direct voltage into a third direct voltage; and
an OELD (Organic Electro-Luminescence Display), for receiving the third direct voltage, comprising a plurality of pixels, wherein each of the pixels comprises:
an organic electro-luminescence diode generating a rated luminance when a rated current flows through the organic electro-luminescence diode; and
a transistor having a source for receiving the third direct voltage, a gate for receiving a pixel voltage, and a drain electrically connected to the organic electro-luminescence diode, wherein:
the rated current corresponds to a rated pixel voltage;
a current flowing through the organic electro-luminescence diode is substantially equal to a current flowing through the transistor; and
when the third direct voltage changes, the transistor generates a current substantially the same as the rated current as the gate of the transistor receives the rated pixel voltage by changing a width-to-length ratio of a channel of the transistor.

21. The electric apparatus according to claim 20, wherein the first direct voltage is supplied by an external power.

22. The electric apparatus according to claim 20, wherein the OELD is a PLED (Polymer Light-Emitting Diode) display.

23. The electric apparatus according to claim 20, wherein the OELD is an OLED (Organic Light-Emitting Diode) display.

24. The electric apparatus according to claim 20, wherein the organic electro-luminescence diode has a negative terminal coupled to a low voltage, and the transistor is a P-type transistor and has the drain electrically connected to a positive terminal of the organic electro-luminescence diode.

25. The electric apparatus according to claim 20, wherein the passive device voltage converting unit is a passive device.

26. The electric apparatus according to claim 20, wherein the organic electro-luminescence diode has a positive terminal coupled to a high voltage, and the transistor is a N-type transistor and has the drain electrically connected to a negative terminal of the organic electro-luminescence diode.

* * * * *

UNITED STATES PATENT AND TRADEMARK OFFICE
CERTIFICATE OF CORRECTION

PATENT NO. : 7,589,718 B2
APPLICATION NO. : 11/212569
DATED : September 15, 2009
INVENTOR(S) : Hu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Twenty-first Day of September, 2010

David J. Kappos
*Director of the United States Patent and Trademark Office*